E. WHITELEY.
Coffee Roaster.
No. 8,057.
2 Sheets—Sheet 1.
Patented April 22, 1851.
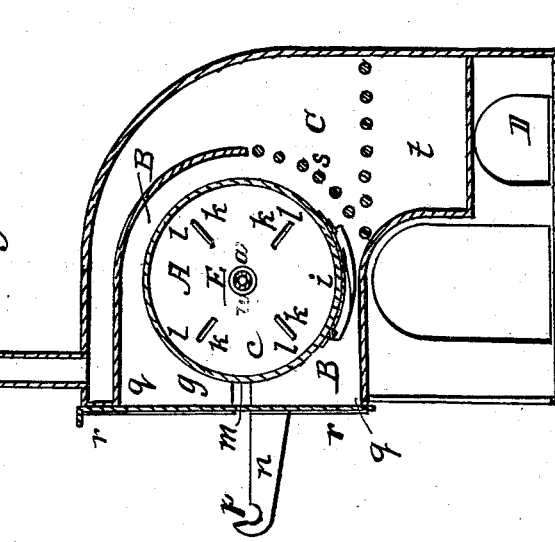
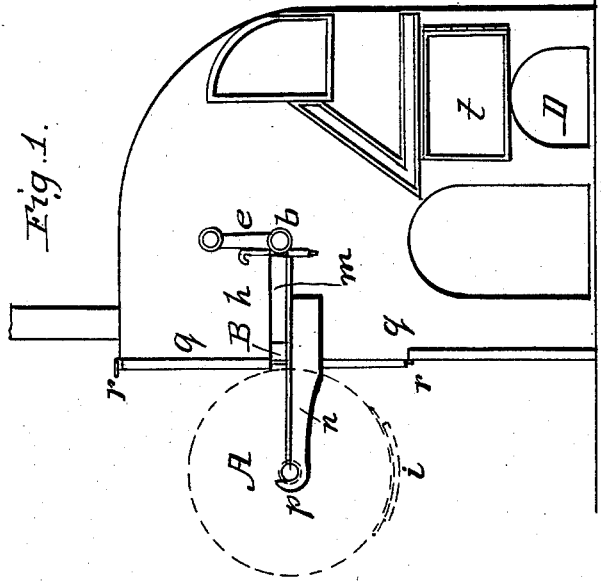

E. WHITELEY.
Coffee Roaster.
No. 8,057.
2 Sheets—Sheet 2.
Patented April 22, 1851.
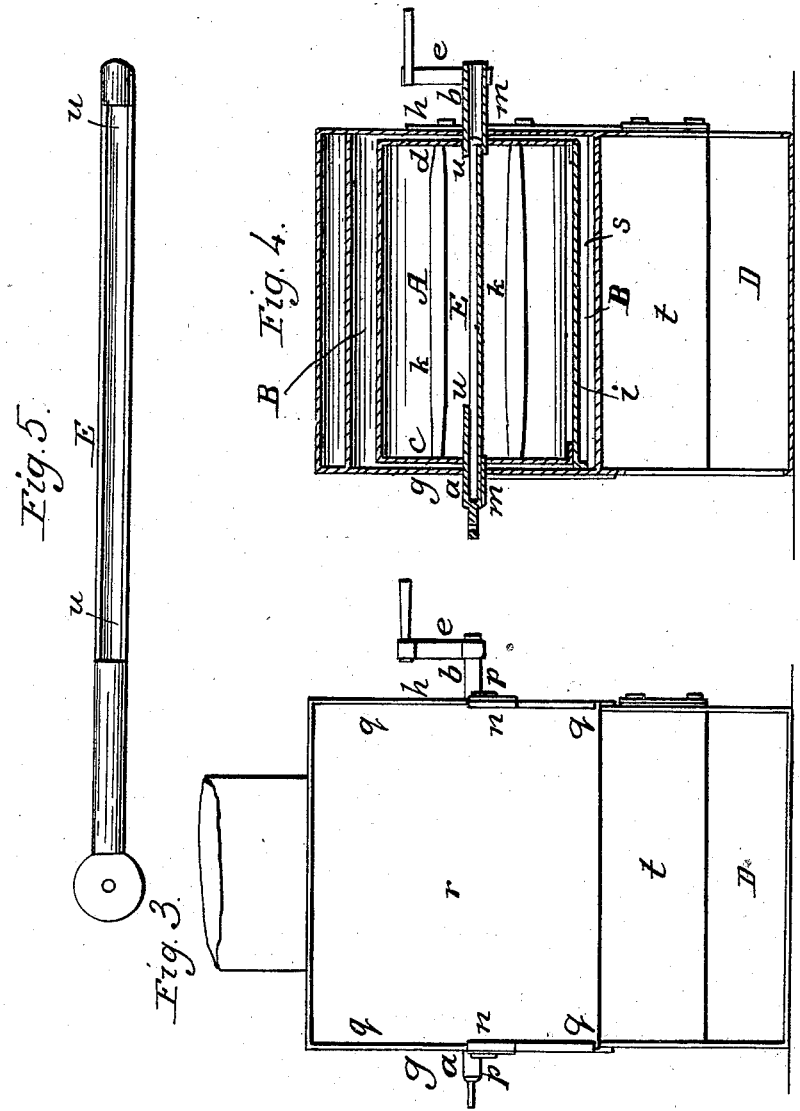

UNITED STATES PATENT OFFICE.

EDWARD WHITELEY, OF BOSTON, MASSACHUSETTS.

COFFEE-ROASTER.

Specification of Letters Patent No. 8,057, dated April 22, 1851.

*To all whom it may concern:*

Be it known that I, EDWARD WHITELEY, of Boston, in the county of Suffolk and State of Massachusetts, have invented an Improved Portable Coffee-Roaster; and I do hereby declare that the same is fully described and represented in the following specification and accompanying drawings, letters, figures, and references thereof.

Of the said drawings Figure 1 denotes an end elevation of my improved portable coffee roaster. Fig. 2 is a vertical central and transverse section of it. Fig. 3 is a front side elevation of it. Fig. 4 is a vertical central and longitudinal section of it. Fig. 5 is a view of the proover tube, as it appears, when removed from the roaster.

In the said drawings A represents a hollow roaster made of a cylindrical shape, and with hollow or tubular journals $a$, $b$, projecting from the middle parts of its two ends or circular heads $c$, $d$, one of the said journals being provided with a crank $e$, or other suitable means of applying power to put the roasting cylinder in revolution. These journals are supported by and turn in suitable bearings formed in the two ends or side plate $g$, $h$, of a chamber B, which I term the roasting cylinder chamber, because the roaster A is received and entirely inclosed within it. The said roaster is provided with a suitable opening for the admission and removal of the coffee, such opening being made through the curved side of it, and supplied with a closing slide or door $i$. A series of wide plates or bars $k$, $k$, $k$, $k$, is placed within the roaster, and made to extend from end to end of it. They are not placed directly against the inner surface of the curved sides of the roaster, but at a distance therefrom, and so that there shall be a space $l$, between each of them, and the inner curved surface of the roaster. When the plates are placed directly in contact with the curved inner surface of the roaster, they are found to retain the coffee too long against the hot sides of the roaster, and so as to cause the coffee to be either burnt or unevenly roasted, but when spaces $l$ are left between them and the curved surface of the roaster, the plates not only perform their office of stirring the mass or putting the coffee in motion, but do not so retain it against the internal surface of the roaster, as to produce the evil effect above mentioned or others which might be enumerated.

A space or recess $m$ is made horizontally in or through each end of the roaster chamber, and in connection with such space, arms or rails $n$, $n$, are made to project from the ends as seen in the drawings. A semicircular or arched depression or bearing $p$, is made in the top surface and near the outer end of each arm or rail $n$, the same being for the reception of the journal of the roaster cylinder when the said cylinder is drawn out of its chamber, or into the position denoted by the dotted lines in Fig. 1. One side of the chamber B is semicircular or thereabouts, while the other is made straight or with a vertical opening as seen at $q$, such as will admit of the entrance or exit of the roaster, such opening being provided with a door or closing slide $r$. The lower part of the curved side of the chamber B, is made of a grate $s$, which not only forms part of the boundary of the said chamber, but at the same time makes part of the boundary of the fire place C, which is placed on or against the side of the roaster chamber B, instead of directly under it, as in other roasting apparatuses, as heretofore constructed. The ash grate of the said fire place C, is seen at $t$, while the ash pit is placed under it, as represented at D. The discharge flue of the fire place is carried either upward or directly over and in contact with the surface of the curved side of the chamber B, and from thence into the chimney.

The prooving tube, consists of a long tube E, see Figs. 2, 4, 5, made with a long slot $u$ through its side, the tube being passed or slid into the tubular journals, of the roaster, they serving to hold it in place. The charge of coffee during the rotation of the roaster, falls in contact with the prover, and fills it, with the roasted kernels. On withdrawing the prover or removing it from the journals, the state of the coffee or extent to which it may be roasted, can readily be observed. In many other kinds of coffee roasters, in order to remove the coffee or supply more, or to ascertain the state of it, the roaster cylinder has to be withdrawn endwise, and supported on a long bar or horizontal shaft, which occupies a great deal of room, and is much in the way of the attendants. Besides the above, the roaster cylinder has been placed directly over the fire place, so that the smoke and flame would either strike directly upward against it or against the bottom of a chamber made to inclose the roaster, such inclosing chamber having been deemed necessary to prevent the entrance of the gas or other volatile product of combustion into the roaster, and to the injury of the coffee. When such inclosing chamber is employed under the old arrangement of the fire place with respect to it, it has been a closed chamber, that is, one made without and opening into the fire place, but in my improved apparatus, such chamber is not a closed one, but has such openings into the fire place, that the roaster is exposed to direct radiation of the heat from the coal, that is to say, such heat of the coal is not intercepted by an unperforated plate before it reaches the outer surface of the roaster. Under the old plan, the inclosing chamber becomes a baking oven, while under my improved plan, the roaster is exposed to the direct action of the fire in the fire place, or to a roasting heat, the gas or volatile products of combustion not coming in contact with it, but being carried upward by the draft. A saving of fuel is not only effected by my improved arrangement, but other advantages are gained.

What I claim is—

1. The combining or arrangement of the fire place or chamber of combustion, the roasting cylinder, and its surrounding chamber, substantially in the manner as above described and as represented in the drawings. Also the arrangement of the flue of the fire chamber, with respect to the latter, and the inclosing chamber of the roaster, the said arrangement of the said flue consisting in carrying it over and in contact with the top of the said inclosing chamber as specified.

2. I also claim the arrangement of the proving tube within the hollow journal, and central part of the roaster not meaning to claim the device termed the proving tube, but simply its arrangement, as specified.

In testimony whereof I have hereto set my signature this twelfth day of December, A. D. 1850.

EDWARD WHITELEY.

Witnesses:
R. H. EDDY,
FRANCIS GOULD.